United States Patent
Ohmura

[11] 3,883,978
[45] May 20, 1975

[54] DEVICE FOR MOUNTING FISHING REELS TO FISHING TACKLE

[75] Inventor: Ryuichi Ohmura, Shizuoka, Japan

[73] Assignee: Fuji Kogyo Co., Ltd., Shizuoka-ken, Japan

[22] Filed: July 12, 1973

[21] Appl. No.: 378,496

[52] U.S. Cl. .................................................. 43/22
[51] Int. Cl. ............................................ A01k 87/06
[58] Field of Search ........................................ 43/22

[56] References Cited
UNITED STATES PATENTS
3,295,244  1/1967  Kuntze ................................. 43/22
FOREIGN PATENTS OR APPLICATIONS
544,100  6/1956  Italy ..................................... 43/22

Primary Examiner—Louis G. Mancene
Assistant Examiner—Daniel J. Leach
Attorney, Agent, or Firm—Kurt Kelman

[57] ABSTRACT

A device for detachably mounting a fishing reel to fishing tackle is disclosed comprising a fore-grip portion and a cap-like rear grip portion, joined axially to each other by an axially elongated connector extending from the fore-grip portion, while leaving an internal space in the vicinity of the joint in which opposed flanges of a T-shaped reel support is disposed and clamped firmly when both grips are connected. A smooth outer gripping surface is thereby provided.

3 Claims, 4 Drawing Figures

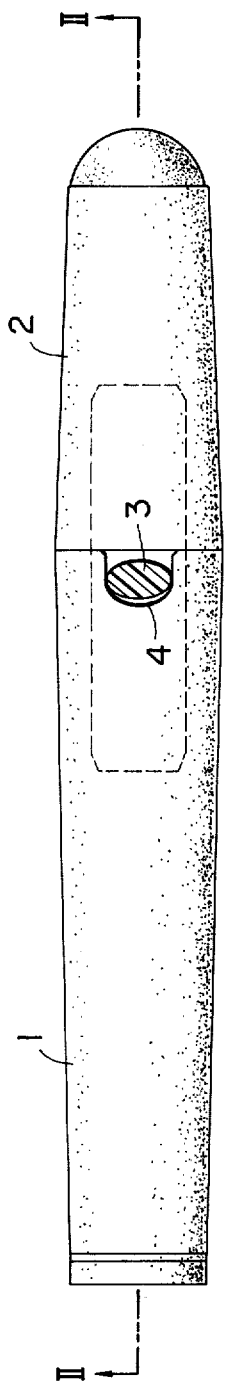
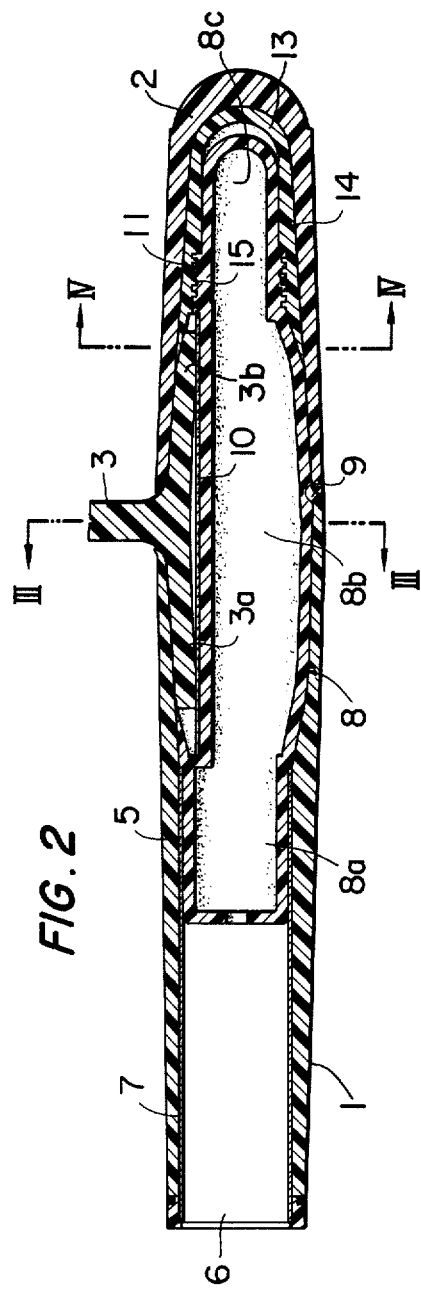
FIG. 1
FIG. 2
FIG. 3
FIG. 4

DEVICE FOR MOUNTING FISHING REELS TO FISHING TACKLE

The present invention relates to a device for detachably mounting a fishing reel to fishing tackle.

A number of prior art devices are known which attempt to satisfy the objection of uncomfortness encountered in operating a fishing rod, particularly at the hand gripping portion where a spinning reel is mounted. Typically, the prior devices have not provided a smooth outer gripping surface for the hands of a user. Some of the prior art devices have a cylindrical rubber cover enclosing the reel seat such as disclosed in U.S. Pat. No. 3,616,564 and U.S. Pat. No. 3,616,565. Because rubber covers are just slipped on top of a tubular body portion of such reel mounting devices, the rubber covers tend to enlarge in diameter and this enlargement is very undesirable. Furthermore, the prior art devices retain the disadvantage in that they have less stability caused by the round seating surface. Also, a limited selection of materials are available to assure structural compactness.

A primary object of the present invention is to provide a device having a smooth gripping surface under which reel supporting flanges are enclosed.

Another object of the present invention is to provide a device for stable support of a spinning reel.

Another object of the present invention is to provide a device which may be constructed from a large selection of the materials.

A further object of the present invention is to provide a device which will provide an easy exchange of reels.

Further features and advantages of the present invention will become more apparent from the following description taken with reference to the accompanying drawings, in which:

FIG. 1 is a top plane view of an embodiment of the device of the present invention.

FIG. 2 is a section taken along sectional line II—II in FIG. 1,

FIG. 3 is a section of the fore-grip portion of the device of the present invention taken along sectional line III—III in FIG. 2, and FIG. 4 is a section of the rear grip portion of the device of the present invention taken along sectional line IV—IV in FIG. 2.

Referring to FIG. 1, an embodiment of the device of the present invention is shown which is comprised of a diverged fore-grip portion 1 and a diverged rear-grip portion 2, the latter being connected axially to fore-grip portion 1 in order to hold reel supporting flanges (not shown). Only a transverse cross section of a reel supporting stem 3 is shown in recess 4 formed in the fore-grip portion at the junction of the two grips.

The detailed structure of fore-grip portion 1 is shown in FIG. 2. Fore-grip portion 1 is constructed with an axially elongated grip-tube 5 whose front opening 6 supports the end of a fishing rod. Tubular reinforcement 7 is tightly inserted into the grip-tube. Connector 8 is tightly inserted into the tubular reinforcement from a rearward opening 9 of the grip-tube.

The connector 8 has a round transverse cross section, on its front part 8a, a peripheral cut-out 10 formed on its middle part 8b and a bullet-shaped rear part 8c having an outer thread 11. The space formed between the wall of the grip-tube and the peripheral cut-out 10 of the middle part of connector 8 is adapted for accommodating front flange 3a and rear flange 3b of the support for the fishing reel.

The structural detail of the middle part of the connector 8 and its related parts are shown in FIG. 3. In order to assure stable attachment of smaller size reel flanges, an adjuster seat 12 is disposed at the bottom surface of the cut-out of connector 8.

The detailed structure of the rear-grip portion 2 is shown in FIG. 2. The rear-grip portion is constructed with tubular cap 13 having a reinforcement 14 at its open end. As seen in FIG. 2, the interior of the tubular cap is forwardly diverged and the cap-shaped reinforcement is provided with an inner thread 15 which is to engage with outer threads of connector 8 when both fore-grip portion 1 and rear-grip portion 2 are assembled to each other. A space is formed between the inner wall of the tubular cap and the peipheral cut-out 10 of connector 8 to accommodate rear flanges 3b of the reel.

In using the device of the present invention, one of the flanges of a spinning reel support is firstly inserted into the space formed between the grip-tube of the fore-grip portion 1 and the peripheral cut-out of the middle part of connector 8. Next, the tubular cap of the rear-grip portion 2 is inserted over the rear part of connector 8 and another flange of the spinning reel. At the same time the rear-grip portion 2 is turned so as to engage both threads when in contact with each other. By screw fastening, the rear-grip portion 2 is firmly connected to the fore-grip portion 1 while the flanges of a spinning reel are clamped securely in between the bottom surface of the peripheral cut-out 10 of connector 8 and inner walls of both grips.

In the practice of the present invention, various modifications may be realized from the above described basic embodiment of the present invention. For example, when the fore-grip tube and rear tubular cap are made of soft plastic material such as rubber, it is desirable to use respective reinforcements 7 and 14. However, when the grip-tube and tubular caps are made of a material of sufficient hardness, those reinforcements may be omitted. Further, all parts of the present device may be made using the same material.

What is claimed is:

1. A device for mounting spinning reels which comprises in combination, a fore-grip portion having a front bore for attachment to an end of a fishing rod, an axially elongated connector tightly secured by one end into a rear bore of the fore-grip portion, said connector having a peripheral cut-out along a surface thereof, a portion of the peripheral cut-out extending under the fore-grip portion, a cut-out opening along the rear bore of the fore-grip portion and disposed above the peripheral cut-out, screw threads formed on the rear part of the connector, a cap-like rear-grip portion having an axial hollow recession disposed for receiving said connector and a portion of the peripheral cut-out, a securely fixed tubular cap disposed within the rear-grip portion, said tubular cap having screw threads on an inner surface thereof disposed to mate with said screw threads of the connector, the fore-grip portion being joined axially with the rear-grip portion by means of the connector, opposed flanges of a spinning reel being accommodated in the peripheral cut-out and within the fore-grip portion and the rear-grip portion, a stem member of the opposed flanges being accommodated by the cut-out opening of the fore-grip portion when the rear bore of the fore-grip portion is clamped firmly to the rear-grip portion.

2. The device of claim 1 wherein an adjuster seat is disposed on the surface of the peripheral cut-out.

3. The device of claim 1 wherein a reinforcement member is provided within the fore-grip portion, the fore-grip portion tapers rearwardly, the connector has a tubular forward portion, and the securely fixed tubular cap has a reinforced portion at the screw threads and being outwardly tapered to accommodate a flange of the fishing reel.

* * * * *